(12) United States Patent
Jalloul et al.

(10) Patent No.: US 9,853,699 B2
(45) Date of Patent: *Dec. 26, 2017

(54) ANTENNA SYSTEMS AND METHODS FOR MASSIVE MIMO COMMUNICATION

(71) Applicant: Avago Technologies General IP (Singapore) Pte. Ltd., Singapore (SG)

(72) Inventors: Louay Jalloul, San Jose, CA (US); Sam Alex, Sunnyvale, CA (US); Amin Mobasher, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,397

(22) Filed: Jun. 29, 2016

(65) Prior Publication Data

US 2016/0308589 A1    Oct. 20, 2016

Related U.S. Application Data (63) Continuation of application No. 14/042,109, filed on Sep. 30, 2013, now Pat. No. 9,407,337.

(60) Provisional application No. 61/812,029, filed on Apr. 15, 2013.

(51) Int. Cl.
| | |
|---|---|
| *H04B 7/02* | (2017.01) |
| *H04B 7/0413* | (2017.01) |
| *H04L 25/02* | (2006.01) |
| *H04B 7/0404* | (2017.01) |
| *H04B 7/06* | (2006.01) |

(52) U.S. Cl.
CPC ......... *H04B 7/0413* (2013.01); *H04B 7/0404* (2013.01); *H04B 7/0684* (2013.01); *H04B 7/0691* (2013.01); *H04L 25/0202* (2013.01); *H04L 25/0204* (2013.01); *H04L 25/0228* (2013.01)

(58) Field of Classification Search
CPC .. H04B 7/0413; H04B 7/0452; H04B 7/0663; H04B 7/024; H04B 7/0434; H04B 7/04; H04B 7/0404; H04B 7/0691; H04B 7/0684; H04B 7/06; H04B 7/02; H04L 25/0204; H04L 27/2647; H04L 2025/03426; H04L 2025/03414; H04L 5/0048; H04L 25/0202; H04L 25/0228; H04L 27/261; H04L 25/0242; H04L 25/02
USPC ........ 375/267, 260, 299, 347, 349; 455/101, 455/103, 102, 132
See application file for complete search history.

(56) References Cited

U.S. PATENT DOCUMENTS

| | | | |
|---|---|---|---|
| 5,936,592 A | 8/1999 | Ramanujam et al. | |
| 9,407,337 B2 * | 8/2016 | Jalloul | ................ H04B 7/0413 |
| 2005/0025271 A1 | 2/2005 | Molisch et al. | |
| 2005/0259627 A1 | 11/2005 | Song et al. | |

(Continued)

*Primary Examiner* — Rahel Guarino
(74) *Attorney, Agent, or Firm* — Sterne, Kessler, Goldstein & Fox P.L.L.C.

(57) ABSTRACT

Antenna systems and methods for Massive Multi-Input-Multi-Output (MIMO) (M-MIMO) communication are provided. Antennas systems include a M-MIMO transmitter architecture with a hybrid matrix structure. The hybrid matrix structure protects against transmit path component failures and ensures that a spatial rate of the M-MIMO transmitter is not degraded by the failures. Antenna systems and methods also include antenna selection schemes for selecting a subset of antennas from a plurality of antennas to transmit to a receiver.

20 Claims, 10 Drawing Sheets

(56) References Cited

U.S. PATENT DOCUMENTS

| | | |
|---|---|---|
| 2008/0108310 A1 | 5/2008 | Tong et al. |
| 2008/0247370 A1 | 10/2008 | Gu et al. |
| 2008/0260002 A1 | 10/2008 | Zhang et al. |
| 2010/0002649 A1 | 1/2010 | Teo et al. |
| 2010/0166098 A1* | 7/2010 | Luz .................. H04B 7/0413 375/267 |
| 2011/0273977 A1 | 11/2011 | Shapira et al. |
| 2012/0014469 A1 | 1/2012 | Zhou |
| 2014/0307814 A1 | 10/2014 | Jalloul et al. |

* cited by examiner

ANTENNA SYSTEMS AND METHODS FOR MASSIVE MIMO COMMUNICATION

CROSS-REFERENCE TO RELATED APPLICATION(S)

The present application is a continuation of U.S. patent application Ser. No. 14/042,109, filed Sep. 30, 2013, which claims the benefit of U.S. Provisional Application No. 61/812,029, filed Apr. 15, 2013, all of which are incorporated herein by reference in their entireties.

BACKGROUND

Technical Field

The present disclosure relates generally to antenna systems and methods for Massive Multi-Input-Multi-Output (MIMO) (M-MIMO) communication.

Background Art

In a Massive Multi-Input-Multi-Output (MIMO) (M-MIMO) communication system, a transmitter, such as a base station, is equipped with a very large number of transmit antennas (e.g., 32, 64, or 100) that can be used simultaneously for transmission to a receiver, such as a user equipment (UE). The receiver can have more than one receive antenna (e.g., 2, 4, 8, etc.) for simultaneously receiving transmissions from the transmitter. The receiver can also be equipped with a very large number of receive antennas.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
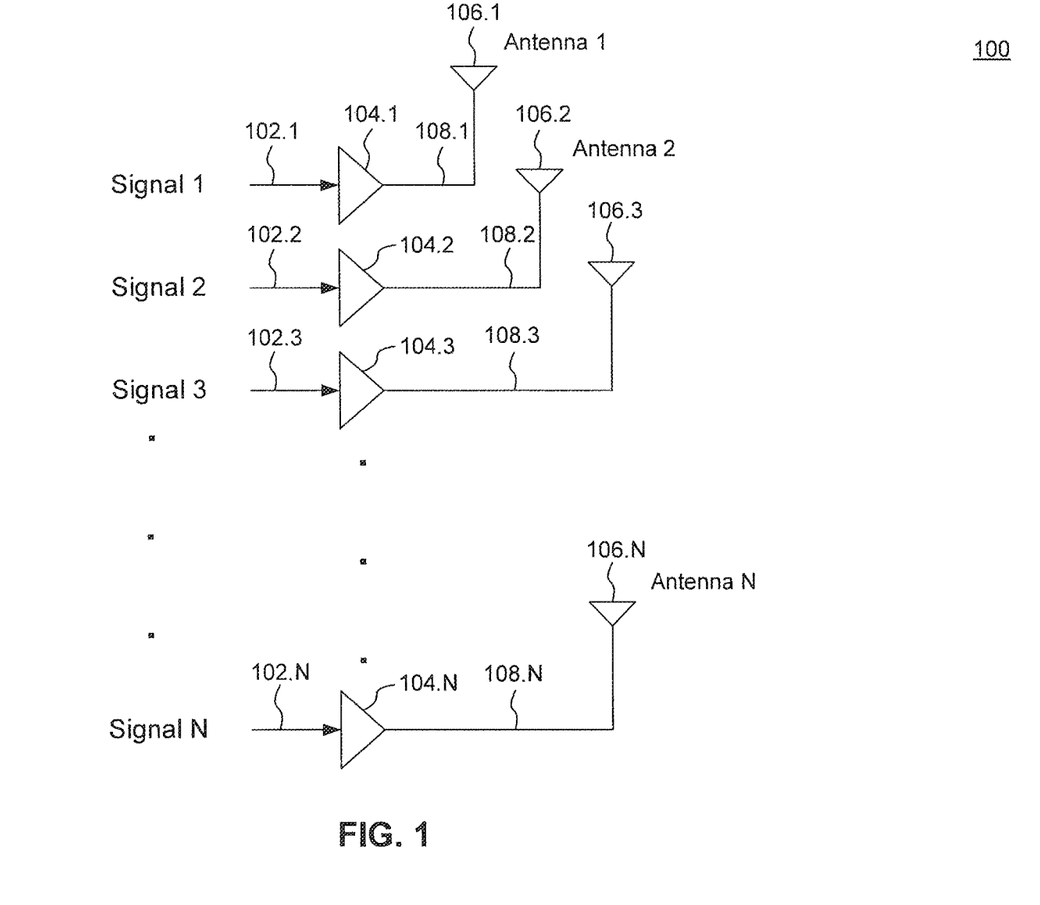
FIG. 1 illustrates an example Massive Multi-Input-Multi-Output (MIMO) (M-MIMO) transmitter.

FIG. 1 illustrates an example Massive Multi-Input-Multi-Output (MIMO) (M-MIMO) transmitter 100. Example M-MIMO transmitter 100 is provided for the purpose of illustration only and is not limiting of embodiments. For the purpose of simplification of presentation, certain components of M-MIMO transmitter 100 are omitted in FIG. 1 as would be apparent to a person of skill in the art. Example M-MIMO transmitter 100 can be located in a base station or a user equipment (UE).

As shown in FIG. 1, example M-MIMO transmitter 100 includes a plurality of power amplifiers (PAs) 104.1, . . . , 104.N and a plurality of antennas 106.1, . . . , 106.N. PAs 104.1, . . . , 104.N and antennas 106.1, . . . , 106.N form a plurality of parallel transmit signal paths of M-MIMO transmitter 100, each of which can be used independently of the others.

In an embodiment, M-MIMO transmitter 100 is used as part of a M-MIMO communication system to transmit information to a receiver (not shown in FIG. 1). For example, M-MIMO transmitter 100 can be located at a base station of a multi-access communication network (e.g., cellular network), and the receiver can be a user equipment (UE). As such, PAs 104.1, . . . , 104.N are configured to receive respectively a plurality of input signals 102.1, . . . , 102.N for transmission to the receiver. In an embodiment, input signals 102.1, . . . , 102.N are received simultaneously or substantially simultaneously by PAs 104.1, . . . , 104.N. Input signals 102.1, . . . , 102.N can contain the same or different information streams. PAs 104.1, . . . , 104.N are configured to amplify respectively input signals 102.1, . . . , 102.N and to forward amplified signals 108.1, . . . , 108.N to antennas 106.1, . . . , 106.N respectively. In an embodiment, antennas 106.1, . . . , 106,N transmit amplified signals 108.1, . . . , 108.N simultaneously or substantially simultaneously to the receiver.

Because the plurality of transmit paths of M-MIMO transmitter 100 are parallel to each other, each of input signals 102.1, . . . , 102.N is processed (e.g., amplified and transmitted) in a single separate transmit path. As a result, failure in a given transmit path (e.g., failure of the PA and/or antenna of the transmit path) can cause the signal being processed through it to be lost and not transmitted to the receiver. This results in a reduction of the transmission spatial rate (number of parallel transmissions) from the transmitter to the receiver and a decrease in Signal-to-Noise Ratio (SNR) at the receiver.

Figure 2:
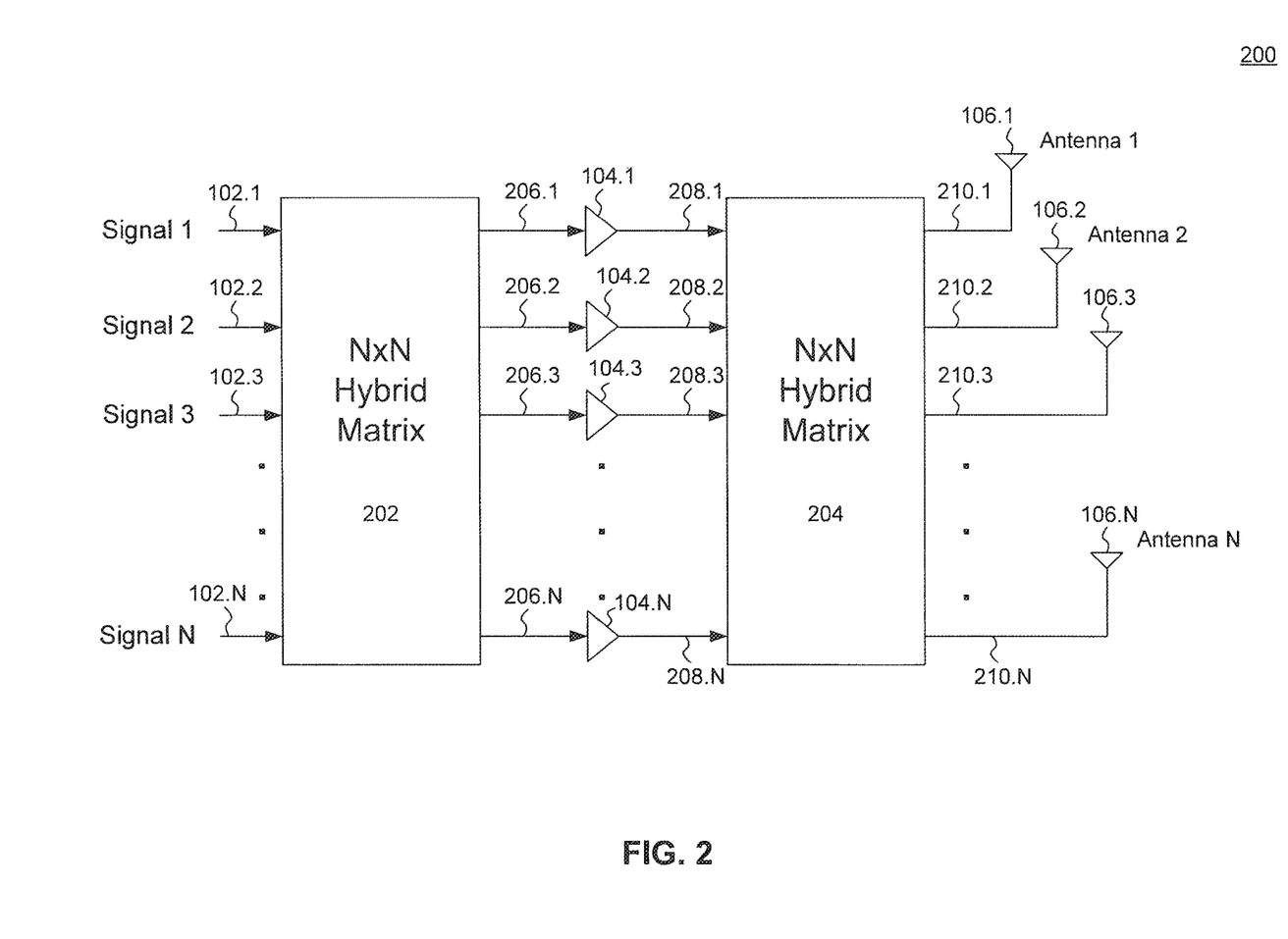
FIG. 2 illustrates an example M-MIMO transmitter using a hybrid matrix according to an embodiment.

FIG. 2 illustrates an example M-MIMO transmitter 200 using a hybrid matrix according to an embodiment. Example M-MIMO transmitter 200 is provided for the purpose of illustration only and is not limiting of embodiments. For the purpose of simplification of presentation, certain components of M-MIMO transmitter 200 arc omitted in FIG. 2 as would be apparent to a person of skill in the art. Example M-MIMO transmitter 200 can be located in a base station or a UE.

Like example M-MIMO transmitter 100, example M-MIMO transmitter 200 also includes a plurality of PAs 104.1, ..., 104.N and a plurality of antennas 106.1, ..., 106.N. In addition, example M-MIMO transmitter 200 includes a first N×N hybrid matrix 202 and a second N×N hybrid matrix 204.

Hybrid matrix 202 is configured to receive the plurality of input signals 102.1, ..., 102.N and to generate a respective plurality of hybrid signals 206.1, ..., 206.N. In an embodiment, hybrid matrix 202 is configured such that each of the plurality of hybrid signals 206.1, ..., 206.N is a combination (e.g., linear combination) of the plurality of input signals 102.1, ..., 102.N. As such, each of hybrid signals 206.1, ..., 206.N includes a component from each of the plurality of input signals 102.1, ..., 102.N.

PAs 104.1, ..., 104.N are each configured to receive a respective one of the plurality of hybrid signals 206.1, ..., 206.N and to generate a respective one of a plurality of amplified hybrid signals 208.1, ..., 208.N. Hybrid matrix 204 is configured to receive the plurality of amplified hybrid signals 208.1, ..., 208.N and to generate a respective plurality of output signals 210.1, ..., 210.N. In an embodiment, hybrid matrix 204 is configured such that each of the plurality of output signals 210.1, ..., 210.N is a combination (e.g., linear combination) of the plurality of amplified hybrid signals 208.1, ..., 208.N.

Output signals 210.1, ..., 210.N each includes a component from each of the plurality of input signals 102.1, ..., 102.N. In an embodiment, hybrid matrix 202 and hybrid matrix 204 are configured to have inverse transfer functions such that input signals 102.1, ..., 102.N all experience a unity gain response by passing through hybrid matrix 202 and hybrid matrix 204. As such, the components from each of the plurality of input signals 102.1, ..., 102.N appear with equal weight (1/N) in each of output signals 210.1, ..., 210.N. Output signals 210.1, ..., 210.N are transmitted respectively by antennas 106.1, ..., 106.N to a receiver. In an embodiment, output signals 210.1, ..., 210.N are transmitted simultaneously or substantially simultaneously to the receiver.

Because each of output signals 210.1, ..., 210.N is a combination of the plurality of input signals 102.1, ..., 102.N, the failure of one or more of PAs 104.1, ..., 104.N and/or one or more of antennas 106.1, ..., 106.N does not cause a loss of a respective input signal 102 and reduction in the transmission spatial rate from the transmitter to the receiver. For example, the failure of PA 104.1 does not result in input signal 102.1 being not transmitted to the receiver as would be the case in example M-MIMO transmitter 100. As such, example M-MIMO transmitter 200 provides an architecture for protecting against component failures in a M-MIMO transmitter.

Figure 3:
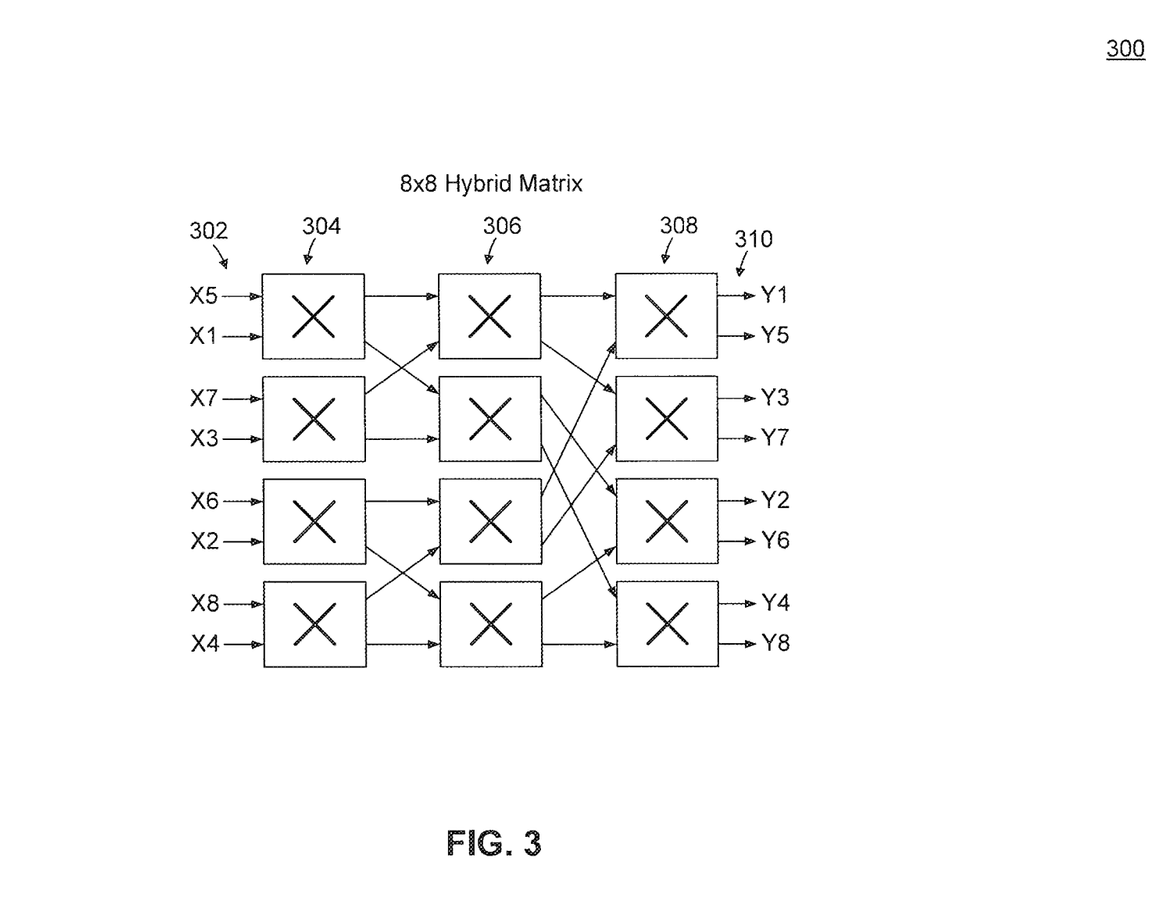
FIG. 3 illustrates an example hybrid matrix according to an embodiment.

FIG. 3 illustrates an example hybrid matrix 300 according to an embodiment. Example hybrid matrix 300 is provided for the purpose of illustration only and is not limiting of embodiments. Example hybrid matrix 300 can be used for hybrid matrix 202 or 204, for example, in example M-MIMO transmitter 200.

For the purpose of illustration, example hybrid matrix 300 is shown as an 8×8 matrix that can receive 8 input signals 302 and generate 8 output signals 310. As would be understood by a person of skill in the art, an N×N hybrid matrix where N is any integer can be formed in a similar fashion as illustrated by example hybrid matrix 300.

In an embodiment, input signals 302 are input in an interleaved manner into hybrid matrix 300 and output signals 310 are produced in an interleaved manner by hybrid matrix 300. In another embodiment, hybrid matrix 300 includes a first stage 304, a second stage 306, and a third stage 308 of 2×2 hybrid couplers. First stage 304 receives input signals 302 and produces the inputs to second stage 306. Second stage 306 in turn produces the inputs to third stage 308, which generates output signals 310.

Figure 4:
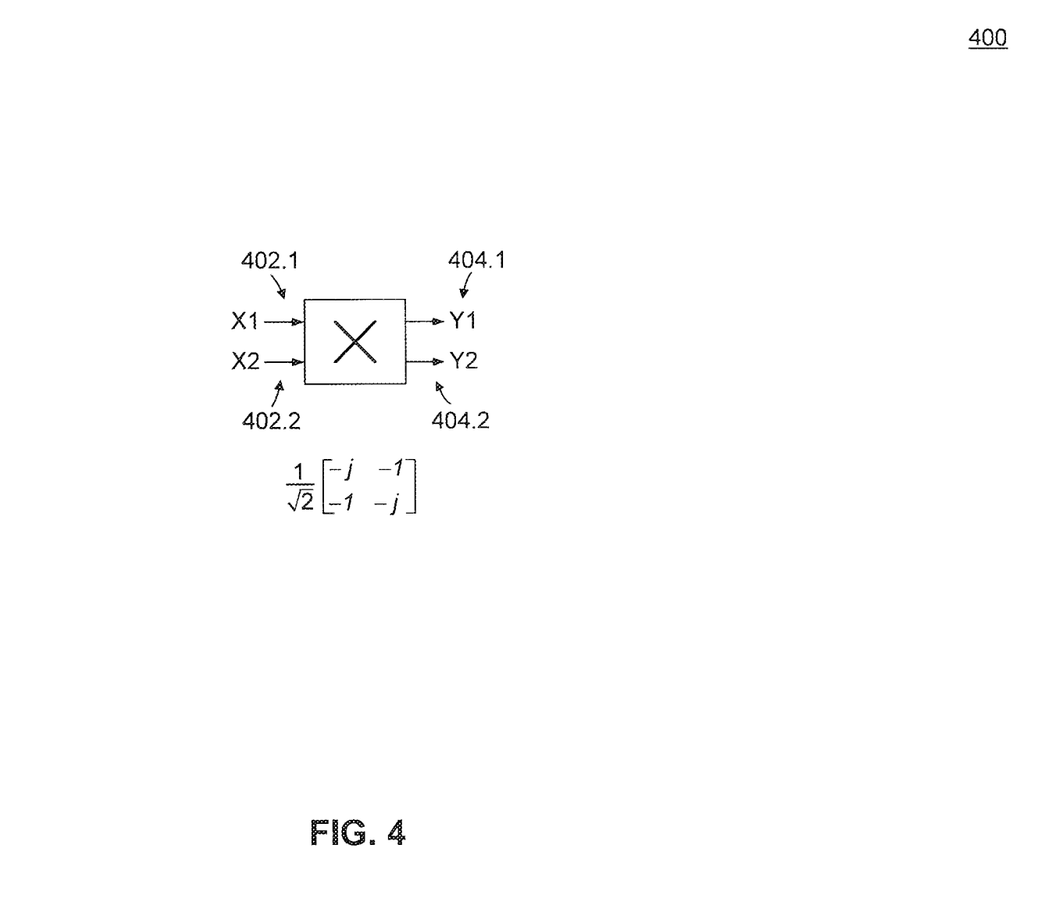
FIG. 4 illustrates an example hybrid coupler that can be used in a hybrid matrix according to an embodiment.

FIG. 4 illustrates an example 2×2 hybrid coupler 400 that can be used in a hybrid matrix, such as 8×8 hybrid matrix 300, according to an embodiment. Example hybrid coupler 400 is provided for the purpose of illustration only and is not limiting of embodiments. As shown in FIG. 4, example hybrid coupler 400 is configured to receive two input signals 402.1 and 402.2 and to generate two output signals 404.1 and 404.2. In an embodiment, output signal 404.1 is given by $Y1=1/\sqrt{2}(-jX1-X2)$ and output signal 404.2 is given by $Y2=1/\sqrt{2}(-X1-jX2)$, where X1 represents input signal 402.1 and X2 represents input signal 402.2. In another embodiment, example hybrid coupler 400 is a 3-dB hybrid coupler.

In the above, embodiments where transmission from a M-MIMO transmitter to a receiver employed all of the N antennas of the M-MIMO transmitter were provided. But, in some cases, transmitting using all of the N antennas of the M-MIMO transmitter to a single receiver can be costly and/or not necessary to achieve the desired performance at the receiver (e.g., where N is very large). In such cases, transmission may be more efficient using only a subset M of the N antennas. Embodiments described below provide methods and systems for determining such a subset of M antennas.

Figure 5:
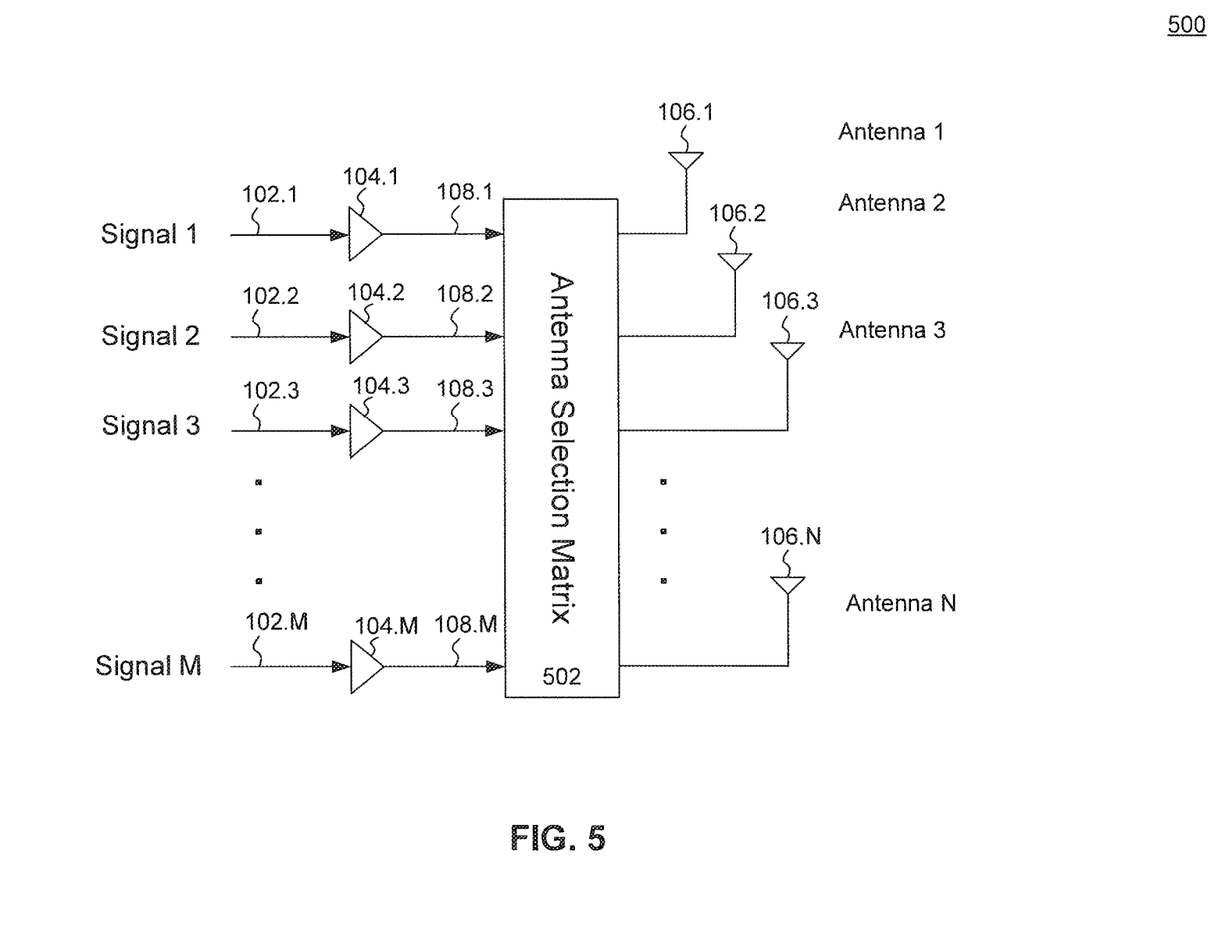
FIG. 5 illustrates an example M-MIMO transmitter using an antenna selection matrix according to an embodiment.

FIG. 5 illustrates an example M-MIMO transmitter 500 using an antenna selection matrix according to an embodiment. Example M-MIMO transmitter 500 is provided for the purpose of illustration only and is not limiting of embodiments. Example M-MIMO transmitter 500 can be located in a base station or a UE. As shown in FIG. 5, example M-MIMO transmitter 500 includes a plurality of PAs 104.1, ..., 104.M, an antenna selection matrix 502, and a plurality of antennas 106.1, ..., 106.N, where M is less than N. As would be understood by a person of skill in the art based on the teachings herein, example M-MIMO transmitter 500 can include more than M PAs (e.g., N), and the embodiment of FIG. 5 illustrates only those PAs (M of them) that are actively receiving one of input signals 102.1, ..., 102.M.

PAs 104.1, ..., 104.M are configured to receive respectively a plurality of input signals 102.1, ..., 102.M for transmission to a receiver. In an embodiment, input signals 102.1, ..., 102.M are received simultaneously or substantially simultaneously by PAs 104.1, ..., 104.M. Input signals 102.1, ..., 102.M can contain the same or different information streams. PAs 104.1, ..., 104.M are configured to amplify respectively input signals 102.1, 102.M and to forward the amplified signals 108.1, ..., 108.M to antenna selection matrix 502.

In an embodiment, antenna selection matrix 502 is an M-input N-output switch matrix. Antenna selection matrix 502 is configured to couple each of amplified signals 108.1, ..., 108.M to a respective one of antennas 106.1, ..., 106.N. Because M is less than N, only M of antennas 106.1, ..., 106.N will have a signal to transmit, and N-M antennas will not be used. In an embodiment, antenna selection matrix 502 couples amplified signals 108.1, ..., 108.M to antennas 106.1, ..., 106.N randomly or according to a pre-determined order that ranks antennas 106.1, ..., 106.N. In another embodiment, as described below with reference to FIG. 6, antenna selection matrix 502 couples amplified signals 108.1, ..., 108.M to antennas 106.1, . . . , 106.N based on an estimate of the channel from antennas 106.1, . . . , 106.N to the antennas of the receiver.

Figure 6:
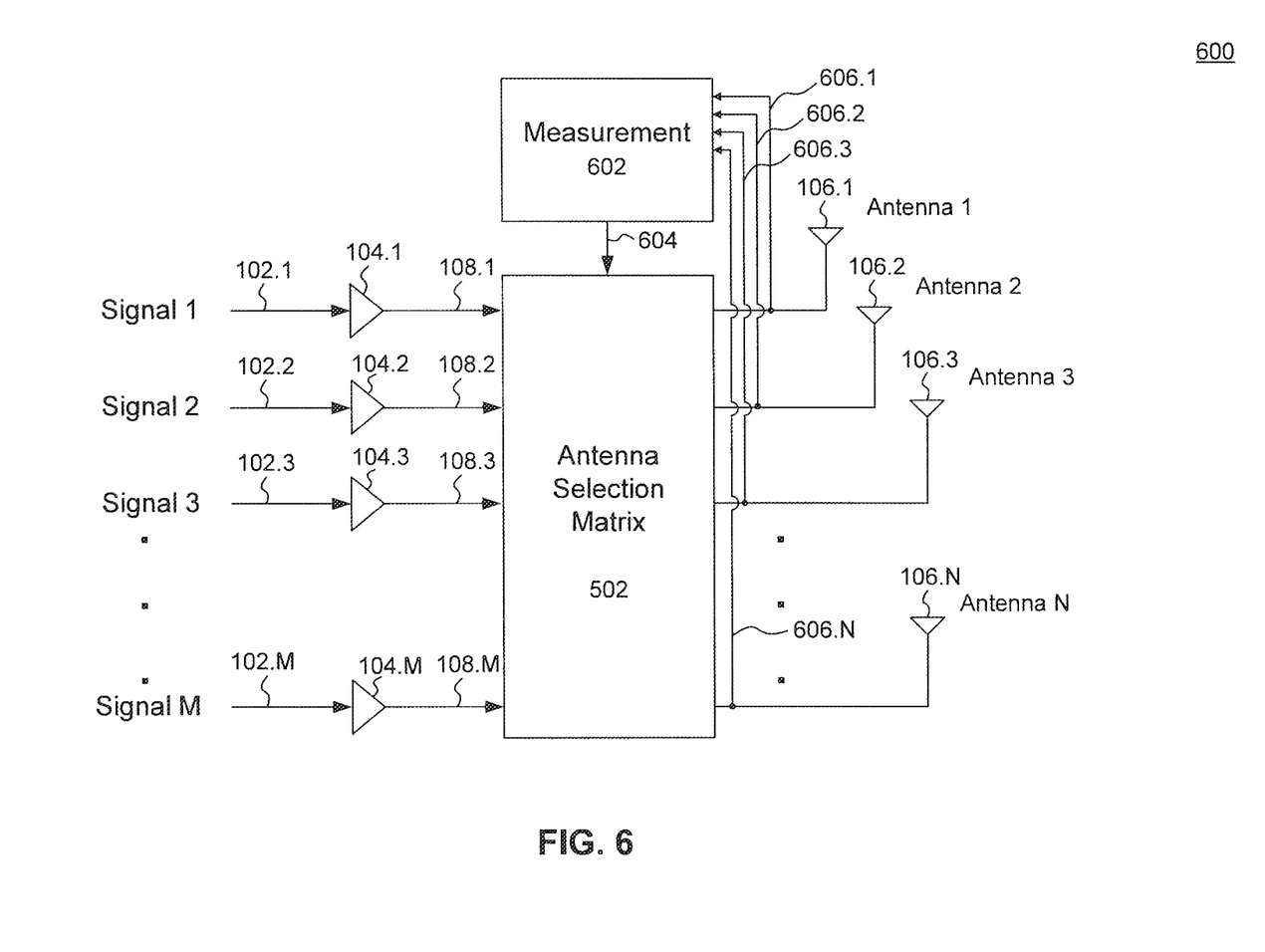
FIG. 6 illustrates another example M-MIMO transmitter using an antennas selection matrix according to an embodiment.

FIG. 6 illustrates another example M-MIMO transmitter 600 using an antennas selection matrix according to an embodiment. Example M-MIMO transmitter 600 is provided for the purpose of illustration only and is not limiting of embodiments. Example M-MIMO transmitter 600 can be located in a base station or a UE. Like example M-MIMO transmitter 500 described above, example M-MIMO transmitter 600 also includes a plurality of PAs 104.1, . . . , 104.M, an antenna selection matrix 502, and a plurality of antennas 106.1, . . . , 106.N, where M is less than N. In addition, example M-MIMO transmitter 600 includes a measurement module 602. Measurement module 602 may include one or more processors to perform the functions described herein.

In an embodiment, measurement module 602 is configured to estimate a channel from the plurality of antennas 106.1, . . . , 106.N to a plurality (e.g., K) antennas at a receiver (K receiver antennas) to which transmission of input signals 102.1, . . . , 102.M is intended. In an embodiment, measurement module 602 is configured to receive, from each of the plurality of antennas 106.1, . . . , 106.N via respective receive signal paths 606.1, . . . , 606.N, K reference signals transmitted respectively by the K receiver antennas. Using each of the K reference signals, measurement module 602 can estimate a sub-channel h from each of the plurality of antennas 106.1, . . . , 106.N to a respective one of the K receiver antennas. The combination of the sub-channels for all K receiver antennas provides a full N×K channel estimate. In an embodiment, the reference signals include sounding reference signals (SRS) as defined by the Long Term Evolution (LTE) standard.

Based on the channel estimate, measurement module 602 is configured to select a subset of size M of the plurality of antennas 106.1, . . . , 106.N to use for transmitting the plurality of amplified signals 108.1, . . . , 108.M to the receiver. In an embodiment, measurement module 602 controls antenna selection matrix 502 using a control signal 604 to couple the plurality of amplified signals 108.1, . . . , 108.M to the selected subset of the plurality of antennas 106.1, . . . , 106.N. Example embodiments for selecting the subset of the plurality of antennas 106.1, . . . , 106.N, based on the channel estimate, are described below. As would be understood by a person of skill in the art based on the teachings herein, embodiments are not limited to these example embodiments.

In one embodiment, measurement module 602 is configured to select a subset that increases channel capacity from M-MIMO transmitter 600 to the receiver. To determine this subset, measurement module 602 begins by choosing a subset of size M from the plurality of antennas 106.1, . . . , 106,N. For the chosen subset, measurement module 602 forms, using the estimated channel, a sub-channel matrix h corresponding to the subset. The sub-channel matrix h includes the M×K row vectors of the channel estimate that correspond to the antennas of the subset. Measurement module 602 then forms a channel matrix A equal to a product of the conjugate transpose (Hermitian) of h by h, and performs a singular value decomposition (SVD) of A to determine a unitary matrix U, a diagonal matrix D having positive diagonal elements $S_1, \ldots, S_K$, and an orthogonal matrix V. Then, measurement module 602 computes a function S of the positive diagonal elements $S_1, \ldots, S_K$ of the diagonal matrix D ($S=f(S_1, \ldots, S_K)$). In an embodiment, the function S is a linear sum of the positive diagonal elements ($S=S_1+ \ldots +S_K$). In another embodiment, the function S is a logarithmic sum of the positive diagonal elements ($S=\log_2(S_1)+ \ldots +\log_2(S_K)$). In an embodiment, measurement module 602 repeats the above described process for all possible subsets of size M (N choose M) of the plurality of antennas 106.1, . . . , 106.N. Then, measurement module 602 chooses the subset with the largest function S as the selected subset of the plurality of antennas 106.1, . . . , 106.N. In another embodiment, measurement module 602 prunes the list of all possible subsets to eliminate quasi-duplicate subsets (subsets that are substantially similar due to their respective antennas being highly correlated), and performs the above process for only the remaining subsets.

In another embodiment, measurement module 602 is configured to select a subset that increases SNR at the receiver. To determine this subset, measurement module 602 determines a matrix H where each column vector h of H corresponds to a respective sub-channel between the plurality of antennas 106.1, . . . , 106.N and a respective one of the plurality of (e.g., K) receiver antennas. Measurement module 602 then forms, for each column vector h of H, a respective vector y by squaring each element of the column vector h. Measurement module 602 then forms a vector S by adding the vectors y (for K receiver antennas, K y vectors are added). Measurement module 602 then determines the M largest elements of the vector 5, and selects M antennas of the plurality of antennas 106.1, . . . , 106.N that correspond to the M largest elements of vector S (the selected M antennas correspond to the indices of the M largest elements of the vector S) as the selected subset of the plurality of antennas 106.1, . . . , 106.N.

In another embodiment, example M-MIMO transmitter 600 receives feedback from the receiver to which transmission of signals 102.1, . . . , 102.M is intended regarding which subset of antennas to select.

Figure 7:
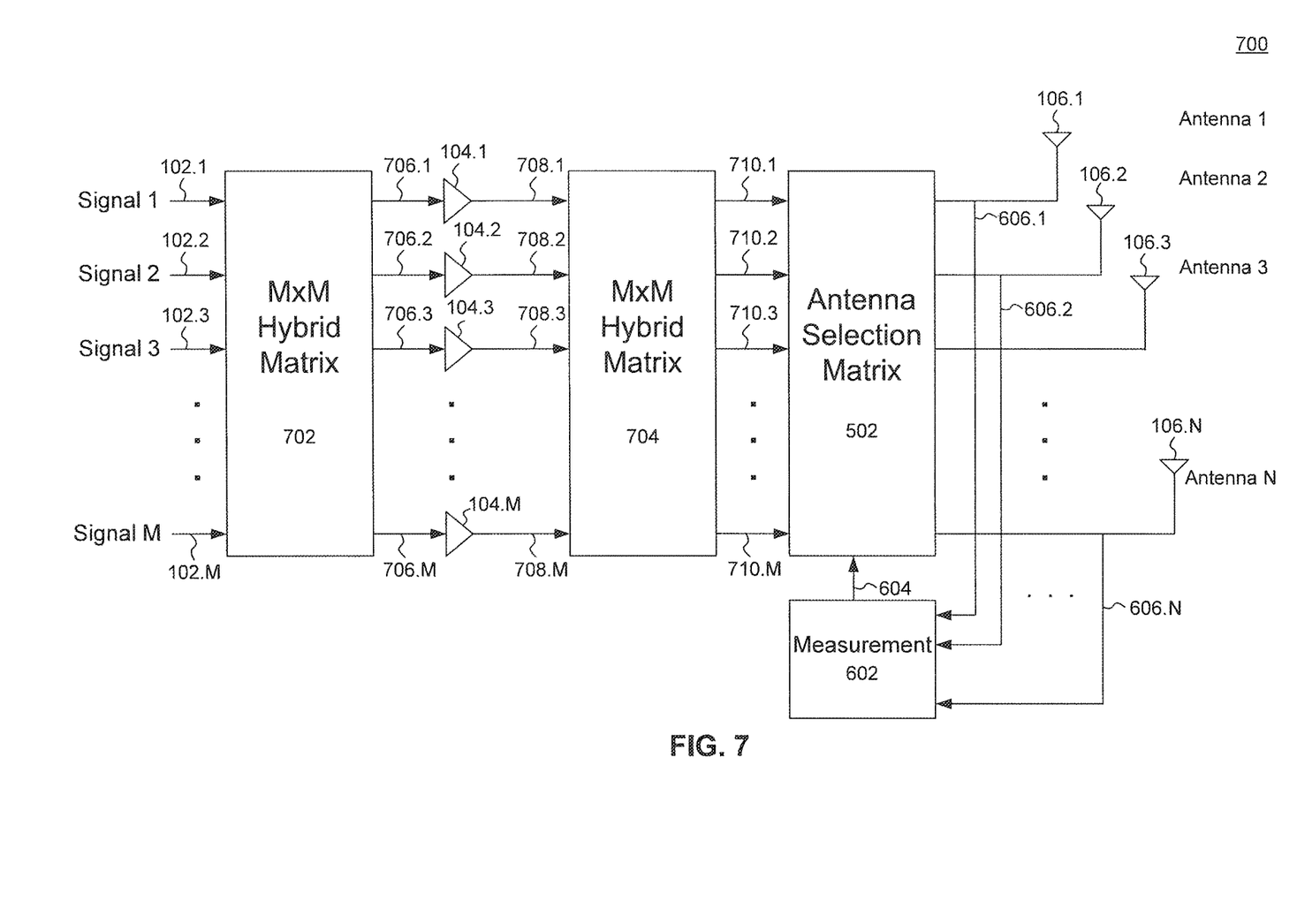
FIG. 7 illustrates an example M-MIMO transmitter using an antenna selection matrix and a hybrid matrix according to an embodiment.

FIG. 7 illustrates an example M-MIMO transmitter 700 using an antenna selection matrix and a hybrid matrix according to an embodiment. Example M M IMO transmitter 700 is provided for the purpose of illustration only and is not limiting of embodiments. Example M-MIMO transmitter 700 can be located in a base station or a UE. Like example M-MIMO transmitter 600 described above, example M-MIMO transmitter 700 also includes a plurality of PAs 104.1, . . . , 104.M, an antenna selection matrix 502, a measurement module 602, and a plurality of antennas 106.1, . . . , 106.N, where M is less than N. In addition, example M-MIMO transmitter 700 includes two M×M hybrid matrices 702 and 704.

As shown in FIG. 7, hybrid matrix 702 is configured to receive the plurality of input signals 102.1, . . . , 102.M and to generate a respective plurality of hybrid signals 706.1, . . . , 706.M. In an embodiment, hybrid matrix 702 is configured such that each of the plurality of hybrid signals 706.1, . . . , 706.M is a combination (e.g., linear combination) of the plurality of input signals 102.1, . . . , 102.M. As such, each of hybrid signals 706.1, . . . , 706.M includes a component from each of the plurality of input signals 102.1, . . . , 102.M.

PAs 104.1, . . . , 104.M are each configured to receive a respective one of the plurality of hybrid signals 706.1, . . . , 706.M and to generate a respective one of a plurality of amplified hybrid signals 708.1, . . . , 708.M. Hybrid matrix 704 is configured to receive the plurality of amplified hybrid signals 708.1, . . . , 708.M and to generate a respective plurality of output signals 710.1, . . . , 710.M. In an embodiment, hybrid matrix 704 is configured such that each of the plurality of output signals 710.1, . . . , 710.M is a combination (e.g., linear combination) of the plurality of amplified hybrid signals 708.1, . . . , 708.M.

Output signals 710.1, . . . , 710.M each includes a component from each of the plurality of input signals 102.1, . . . , 102.M. In an embodiment, hybrid matrix 702 and hybrid matrix 704 are configured to have inverse transfer functions such that input signals 102.1, . . . , 102.M all experience a unity gain response by passing through hybrid matrix 702 and hybrid matrix 704. As such, the components from each of the plurality of input signals 102.1, . . . , 102.M appear with equal weight (1/M) in each of output signals 710.1, . . . , 710.M.

Antenna selection matrix 502 is an M-input N-output switch matrix. In an embodiment, antenna selection matrix 502 is configured to receive output signals 710.1, . . . , 710.M and to couple each of output signals 710.1, . . . , 710.M to respective one of a subset of size M of antennas 106.1, . . . , 106.N. Because M is less than N, only M of antennas 106.1, . . . , 106.N will have a signal to transmit, and N-M antennas will not be used.

In an embodiment, antenna selection matrix 502 couples output signals 710.1, . . . , 710.M to antennas 106.1, . . . , 106.N in accordance with control signal 604 from measurement module 602. In another embodiment, as described above with reference to FIG. 6, measurement module 602 is configured to select the subset of size M of the plurality of antennas 106.1, . . . , 106.N based on an estimate of a channel from the plurality of antennas 106.1, . . . , 106.N to a plurality of (e.g., K) antennas at a receiver (K receiver antennas) to which transmission of input signals 102.1, . . . , 102.M is intended.

Figure 8:
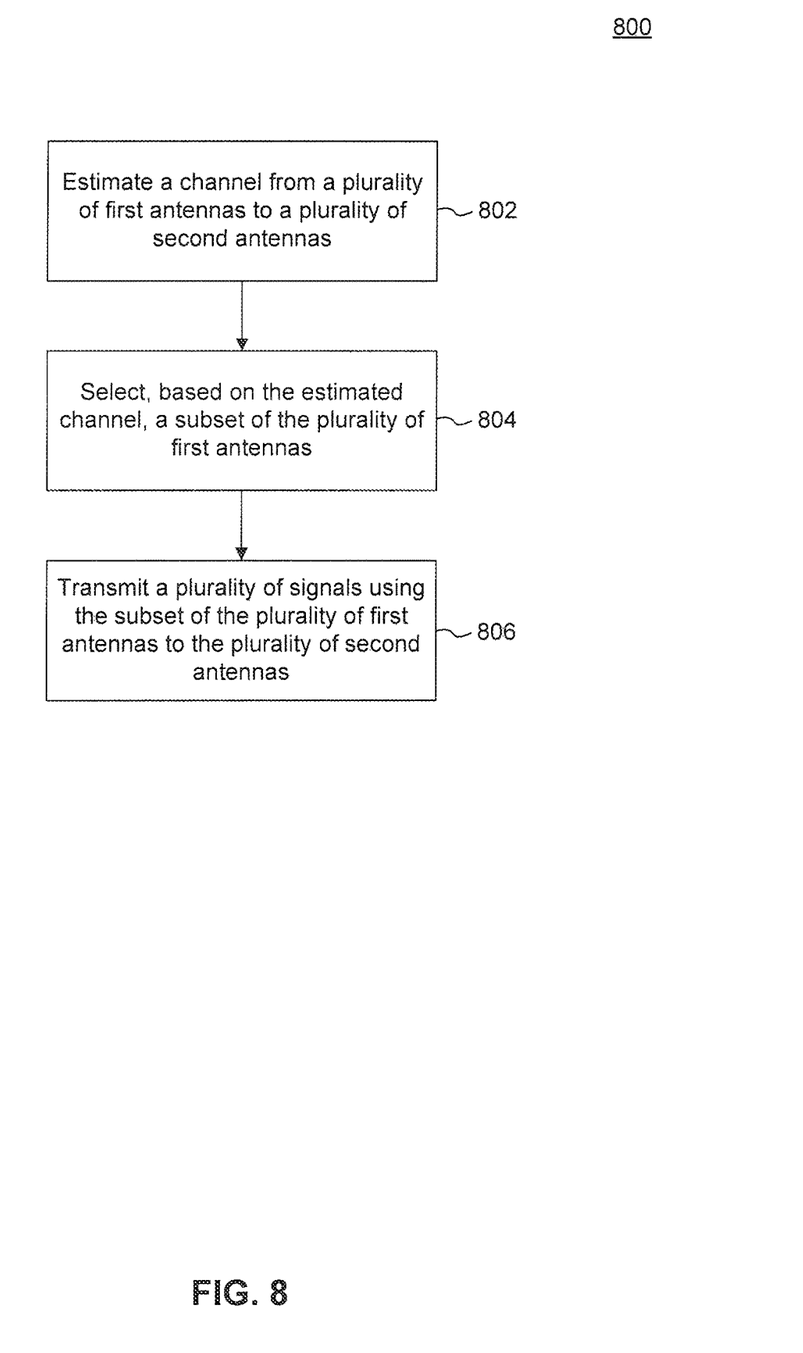
FIG. 8 illustrates an example process for M-MIMO antenna selection according to an embodiment.

FIG. 8 illustrates an example process 800 for M-MIMO antenna selection according to an embodiment. Example process 800 can be performed by an M-MIMO) transmitter, such as example M-MIMO transmitters 600 and 700 described above, for example.

As shown in FIG. 8, process 800 begins in step 802, which includes estimating a channel from a plurality of first antennas to a plurality of second antennas. In an embodiment, step 802 can be performed by a measurement module, such as measurement module 602 described above with reference to FIG. 6. In an embodiment, the plurality of first antennas are located at a base station and the plurality of second antennas are located at a UE. In another embodiment, the plurality of first antennas are located at the UE and the plurality of second antennas are located at the base station.

In an embodiment, step 802 further includes receiving, from each of the plurality of first antennas, a plurality of reference signals transmitted respectively by the plurality of second antennas; and estimating the channel using the plurality of reference signals. The plurality of reference signals can include sounding reference signals (SRS).

Next, process 800 proceeds to step 804, which includes selecting, based on the estimated channel, a subset of the plurality of first antennas. In an embodiment, step 804 can be performed by a measurement module, such as measurement module 602 described above with reference to FIG. 6. In an embodiment, the subset of the plurality of first antennas is used to transmit a plurality of signals to the plurality of second antennas, and step 804 further includes selecting the subset of the plurality of first antennas that increases channel capacity from the plurality of first antennas to the plurality of second antennas and/or that increases SNR at the receiver. In another embodiment, step 804 further includes performing a process as described below with reference to FIGS. 9 and 10 to select the subset of the plurality of first antennas.

Process 800 terminates in step 806, which includes transmitting a plurality of signals using the selected subset of the plurality of first antennas to the plurality of second antennas. In an embodiment, step 806 can be performed by an antenna selection matrix, such as antenna selection matrix 502 described above with reference to FIG. 5, and the subset of the plurality of first antennas selected in step 804.

Figure 9:
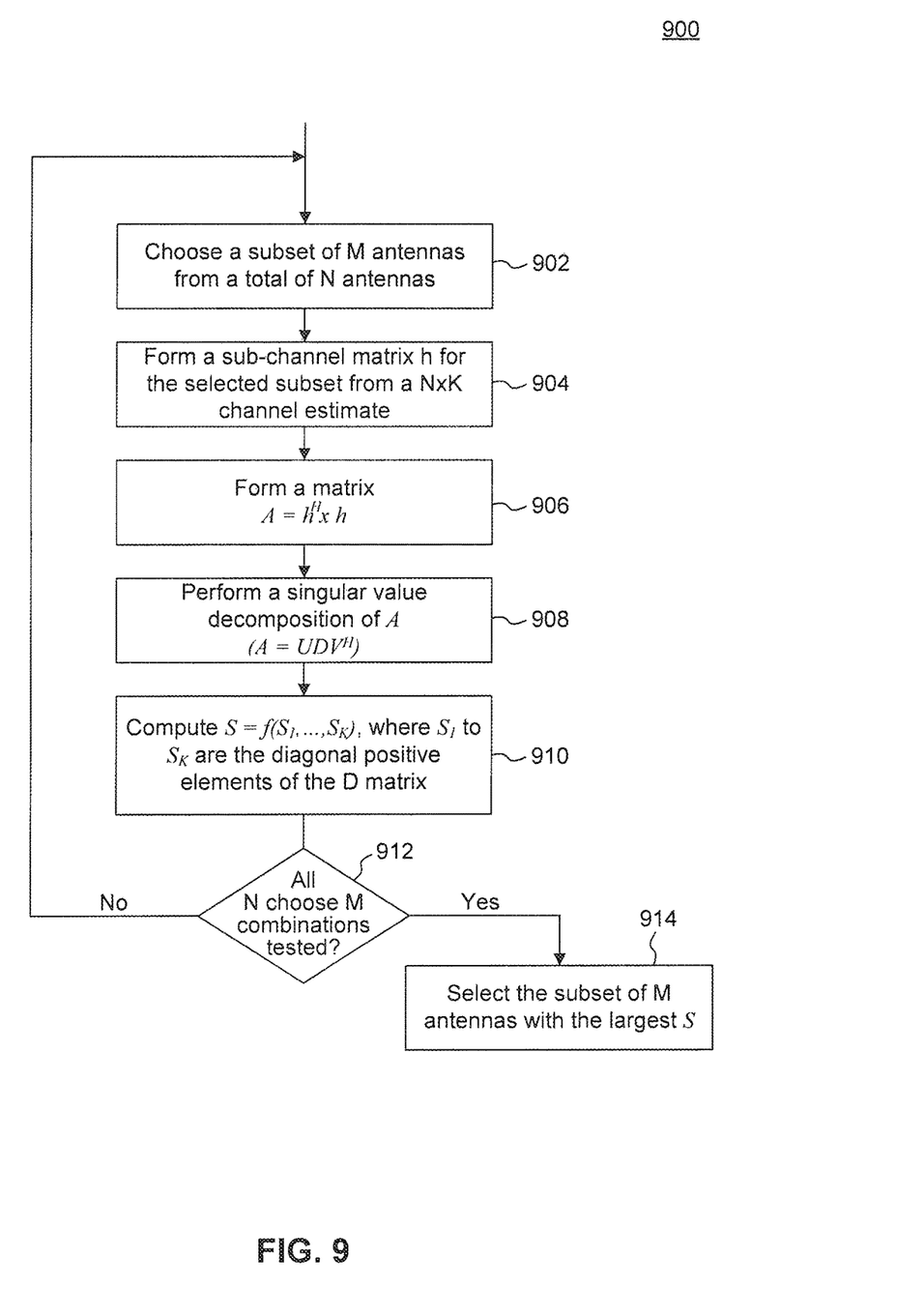
FIG. 9 illustrates another example process for M-MIMO antenna selection according to an embodiment.

FIG. 9 illustrates another example process 900 for M-MIMO antenna selection according to an embodiment. Example process 900 is provided for the purpose of illustration only and is not limiting of embodiments. Example process 900 can be performed by an M-MIMO transmitter having a plurality of antennas, such as example M-MIMO transmitters 600 and 700 described above, for example. More specifically, process 900 can be performed by a measurement module, such as measurement module 602 described above with reference to FIG. 6, to select a subset of antennas from the plurality of antennas once a channel estimate has been determined. Process 900 assumes for the purpose of illustration that the number of the plurality of antennas is equal to N, that the size of the selected subset is equal to M, and that the intended receiver has K antennas.

As shown in FIG. 9, process 900 begins in step 902, which includes choosing a subset of M antennas from a total of N antennas. For the chosen subset, step 904 includes forming, using the channel estimate (N×K channel estimate), a sub-channel matrix h corresponding to the subset. The sub-channel matrix h includes the M×K row vectors of the channel estimate that correspond to the antennas of the subset.

Then, in step 906, process 900 includes forming a channel matrix A equal to a product of the conjugate transpose (Hermitian) of h by h. Subsequently, in step 908, a singular value decomposition (SVD) of A is performed to determine a unitary matrix U, a diagonal matrix D having positive diagonal elements $S_1, \ldots, S_K$, and an orthogonal matrix V.

Then, in step 910, process 900 includes computing a function S of the positive diagonal elements $S_1, \ldots, S_K$ of the diagonal matrix D ($S=f(S_1, \ldots, S_K)$). In an embodiment, the function S is a linear sum of the positive diagonal elements ($S=S_1+ \ldots +S_K$). In another embodiment, the function S is a logarithmic sum of the positive diagonal elements ($S=\log_2(S_1)+ \ldots +\log_2(S_K)$).

At step 912, process 900 includes determining whether all N choose M combinations (all subsets of size M) have been tested. If not, process 900 returns to step 902 to choose a new subset of M antennas that has not yet been tested. Otherwise, process 900 proceeds to step 914, which includes choosing the subset with the largest function S as the selected subset of the plurality of antennas. In an embodiment, this subset maximizes channel capacity from the M-MIMO transmitter to the receiver.

Figure 10:
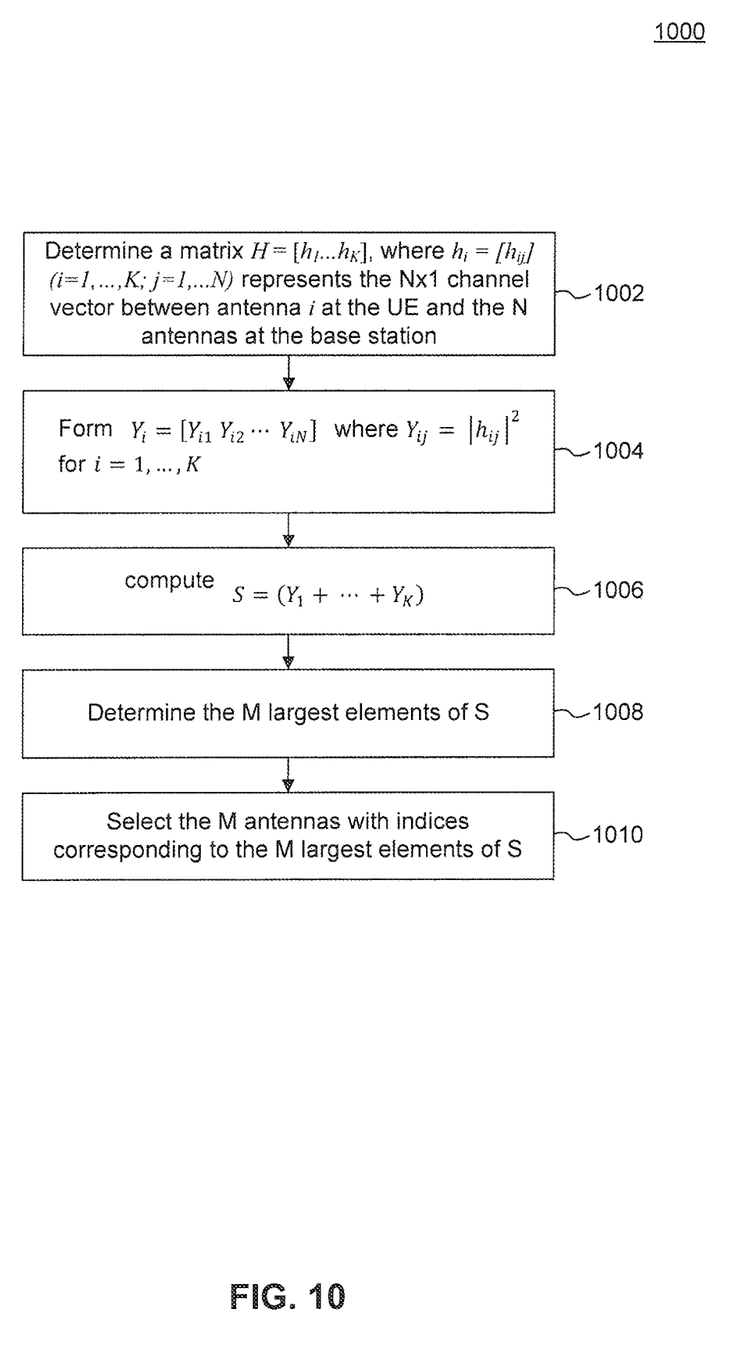
FIG. 10 illustrates another example process for M-MIMO antenna selection according to an embodiment.

FIG. 10 illustrates another example process for M-MIMO antenna selection according to an embodiment. Example process 1000 is provided for the purpose of illustration only and is not limiting of embodiments. Example process 1000 can be performed by an M-MIMO transmitter having a plurality of antennas, such as example M-MIMO transmitters 600 and 700 described above, for example. More specifically, process 1000 can be performed by a measurement module, such as measurement module 602 described above with reference to FIG. 6, to select a subset of antennas from the plurality of antennas once a channel estimate has been determined. Process 1000 assumes for the purpose of illustration that the number of the plurality of antennas is equal to N, that the size of the selected subset is equal to M, and that the intended receiver has K antennas.

As shown in FIG. 10, process 1000 begins in step 1002, which includes determining a matrix H where each column vector h of H corresponds to a respective sub-channel between the plurality of antennas and a respective one of the plurality of (e.g., K) receiver antennas (each column vector h has N elements). Subsequently, in step 1004, process 1000 includes forming, for each column vector h of H, a respective vector y by squaring each element of the column vector h (each vector y has N elements). Then, in step 1006, process 1000 includes forming a vector S by adding the vectors y obtained in step 1004 (the vector S has N elements). For K receiver antennas, S is the sum of K vectors y.

In step 1008, the largest M elements (out of N) of S are determined. Finally, in step 1010, the M antennas (of the plurality of N antennas) with indices corresponding to the largest M elements of S are selected as the selected subset of the plurality of antennas. In an embodiment, this subset maximizes SNR at the receiver.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A Multi-Input-Multi-Output (MIMO) antenna system, comprising:
   a circuit implementation of, or a programmed processor implementation of, a first M-input M-output hybrid matrix configured to receive a plurality of input signals and generate a respective plurality of hybrid signals, wherein each of the plurality of hybrid signals is a combination of the plurality of input signals, and wherein M is equal to the number of the plurality of input signals;
   a circuit implementation of a plurality of power amplifiers (PAs) each configured to receive a respective one of the plurality of hybrid signals and to generate a respective one of a plurality of amplified hybrid signals;
   a circuit implementation of a second M-input M-output hybrid matrix configured to receive the plurality of amplified hybrid signals and to generate a plurality of output signals, wherein each of the plurality of output signals includes a component from each of the plurality of input signals with equal weight; and
   a plurality of first antennas for transmitting the plurality of output signals to a plurality of second antennas.

2. The MIMO antenna system of claim 1, wherein the plurality of first antennas are located at a base station, and the plurality of second antennas are located at a user equipment (UE).

3. The MIMO antenna system of claim 1, further comprising:
   a programmed processor implementation of a measurement module, coupled to the plurality of first antennas, configured to estimate a channel from the plurality of first antennas to the plurality of second antennas and to select a subset of the plurality of first antennas, based on the estimated channel, for transmitting the plurality of output signals to the plurality of second antennas.

4. The MIMO antenna system of claim 3, further comprising:
   a circuit implementation of an antenna selection matrix configured to receive the plurality of output signals for transmission,
   wherein the measurement module is further configured to control the antenna selection matrix to couple the plurality of output signals to the selected subset of the plurality of first antennas.

5. The MIMO antenna system of claim 4, wherein the antenna selection matrix includes an M-input N-output switch matrix, where M is equal to the number of the plurality of output signals and N is equal to the number of the plurality of first antennas.

6. The MIMO antenna system of claim 3, wherein the measurement module is further configured to receive, from at least one of the plurality of first antennas, a plurality of reference signals transmitted respectively by the plurality of second antennas and to estimate the channel using the plurality of reference signals.

7. The MIMO antenna system of claim 6, wherein the plurality of reference signals include sounding reference signals (SRS).

8. A method comprising:
   receiving a plurality of input signals;
   generating a respective plurality of hybrid signals, wherein each of the plurality of hybrid signals is a combination of the plurality of input signals;
   generating a respective one of a plurality of amplified hybrid signals based on a respective one of the plurality of hybrid signals;
   generating a plurality of output signals, wherein each of the plurality of output signals is a combination of the plurality of amplified hybrid signals;
   transmitting the plurality of output signals from a plurality of first antennas to a plurality of second antennas;
   estimating a channel from the plurality of first antennas to the plurality of second antennas; and
   selecting a subset of the plurality of first antennas, based on the estimated channel, for transmitting the plurality of output signals to the plurality of second antennas.

9. The method of claim 8, wherein the plurality of first antennas are located at a base station.

10. The method of claim 8, further comprising:
    coupling the plurality of output signals to the selected subset of the plurality of first antennas.

11. The method of claim 8, further comprising:
- receiving, from at least one of the plurality of first antennas, a plurality of reference signals transmitted respectively by the plurality of second antennas; and
- estimating the channel using the plurality of reference signals.

12. The method of claim 11, wherein the plurality of reference signals include sounding reference signals (SRS).

13. The method of claim 8, wherein the plurality of second antennas are located at a user equipment (UE).

14. A Multi-Input-Multi-Output (MIMO) antenna system, comprising:
- a circuit implementation of, or a programmed processor implementation of, a first M-input M-output hybrid matrix configured to receive a plurality of input signals and to generate a respective plurality of hybrid signals, wherein each of the plurality of hybrid signals is a combination of the plurality of input signals, and wherein M is equal to the number of the plurality of input signals;
- a circuit implementation of a plurality of power amplifiers (PAs) each configured to receive a respective one of the plurality of hybrid signals and to generate a respective one of a plurality of amplified hybrid signals;
- a circuit implementation of a second M-input M-output hybrid matrix configured to receive the plurality of amplified hybrid signals and to generate a plurality of output signals, wherein each of the plurality of output signals is a combination of the plurality of amplified hybrid signals; and
- a plurality of first antennas for transmitting the plurality of output signals to a plurality of second antennas, wherein the plurality of first antennas are located at a base station, and the plurality of second antennas are located at a user equipment (UE),
- wherein the first hybrid matrix and the second hybrid matrix have inverse transfer functions.

15. The MIMO antenna system of claim 14, further comprising:
- a programmed processor implementation of a measurement module, coupled to the plurality of first antennas, configured to estimate a channel from the plurality of first antennas to the plurality of second antennas and to select a subset of the plurality of first antennas, based on the estimated channel, for transmitting the plurality of output signals to the plurality of second antennas.

16. The MIMO antenna system of claim 15, further comprising:
- a circuit implementation of an antenna selection matrix configured to receive the plurality of output signals for transmission,
- wherein the measurement module is further configured to control the antenna selection matrix to couple the plurality of output signals to the selected subset of the plurality of first antennas.

17. The MIMO antenna system of claim 16, wherein the antenna selection matrix includes an M-input N-output switch matrix, where M is equal to the number of the plurality of output signals and N is equal to the number of the plurality of first antennas.

18. The MIMO antenna system of claim 15, wherein the measurement module is further configured to receive, from at least one of the plurality of first antennas, a plurality of reference signals transmitted respectively by the plurality of second antennas and to estimate the channel using the plurality of reference signals.

19. The MIMO antenna system of claim 18, wherein the plurality of reference signals include sounding reference signals (SRS).

20. The MIMO antenna system of claim 14, wherein the plurality of first antennas are located at a base station, and the plurality of second antennas are located at a user equipment (UE).

* * * * *